US012676537B2

(12) United States Patent
Lei et al.

(10) Patent No.: US 12,676,537 B2
(45) Date of Patent: Jul. 7, 2026

(54) OSCILLATING LINEAR MOTOR WITH ROTORS, STATOR AND SWING ROD FIXED TO SEAT

(71) Applicant: NINGBO GAOLI ELECTRONIC TECHNOLOGY CO., LTD., Ningbo (CN)

(72) Inventors: Chunhuo Lei, Ningbo (CN); Jun Xiao, Ningbo (CN); Yizhong Gao, Ningbo (CN)

(73) Assignee: NINGBO GAOLI ELECTRONIC TECHNOLOGY CO., LTD., Ningbo (CN)

( * ) Notice: Subject to any disclaimer, the term of this patent is extended or adjusted under 35 U.S.C. 154(b) by 144 days.

(21) Appl. No.: 18/606,256

(22) Filed: Mar. 15, 2024

(65) Prior Publication Data

US 2024/0223055 A1 Jul. 4, 2024

(30) Foreign Application Priority Data

Jan. 16, 2024 (CN) .......................... 202410066264.0

(51) Int. Cl.
*H02K 3/02* (2006.01)
*H02K 33/02* (2006.01)
(52) U.S. Cl.
CPC .................................... *H02K 33/02* (2013.01)
(58) Field of Classification Search
CPC ........ H02K 33/02; H02K 33/04; H02K 33/16; H02K 33/12; H02K 33/18; H02K 7/145; B26B 19/282

USPC ....................................................... 310/15–25
See application file for complete search history.

(56) References Cited

U.S. PATENT DOCUMENTS

| | | | | |
|---|---|---|---|---|
| 5,306,183 A * | 4/1994 | Holt | ....................... | H02K 21/14 |
| | | | | 440/6 |
| 5,632,087 A * | 5/1997 | Motohashi | ............ | B26B 19/282 |
| | | | | 30/43.92 |
| 5,720,160 A * | 2/1998 | Traxler | .................... | D01H 7/12 |
| | | | | 57/76 |
| 5,921,134 A * | 7/1999 | Shiba | .................... | B26B 19/282 |
| | | | | 310/20 |
| 6,181,090 B1 * | 1/2001 | Amaya | .................. | H02K 33/16 |
| | | | | 318/128 |
| 6,226,871 B1 * | 5/2001 | Eichhorn | ................ | B26B 19/28 |
| | | | | 30/346.51 |
| 7,053,507 B2 * | 5/2006 | Kobayashi | ............. | H02K 33/16 |
| | | | | 310/15 |
| 8,522,382 B2 * | 9/2013 | Lee | ....................... | A46B 5/0095 |
| | | | | 15/28 |

(Continued)

*Primary Examiner* — Maged M Almawri
(74) *Attorney, Agent, or Firm* — Hemisphere Law, PLLC

(57) ABSTRACT

The present disclosure discloses an oscillating linear motor, including a housing. A coil fixing base for winding a coil is mounted in the housing. A stator is fixed to an interior of the coil fixing base. Rotors float at a top of the stator. Two groups of rotors are arranged symmetrically. A movable bottom seat is arranged above each group of rotors. The movable bottom seats are driven to move by respective rotors. Both sides of the movable bottom seat are connected to connecting pieces. An upper end and a lower end of the connecting piece are respectively connected to the housing and the movable bottom seat. A swing rod is fixed to an upper part of each movable bottom seat.

5 Claims, 8 Drawing Sheets

(56)  References Cited

U.S. PATENT DOCUMENTS

| | | | |
|---|---|---|---|
| 8,680,723 B2 * | 3/2014 | Subramanian | H02K 33/06 |
| | | | 310/12.01 |
| 9,132,058 B2 * | 9/2015 | Imboden | A61H 23/0263 |
| 10,195,752 B2 * | 2/2019 | Perlberg | B26B 19/18 |
| 11,052,553 B2 * | 7/2021 | Murakami | H02K 7/04 |
| 11,581,828 B2 * | 2/2023 | Haronian | H02N 2/18 |
| 11,791,702 B2 * | 10/2023 | Delaisse | H02K 33/04 |
| | | | 417/413.1 |
| 12,283,861 B1 * | 4/2025 | Lei | H02K 1/22 |
| 2003/0094861 A1 * | 5/2003 | Shimizu | H02K 33/10 |
| | | | 310/36 |
| 2004/0046461 A1 * | 3/2004 | Shimizu | H02K 33/16 |
| | | | 310/12.15 |
| 2005/0001491 A1 * | 1/2005 | Fujiwara | H02K 33/16 |
| | | | 310/15 |
| 2005/0140219 A1 * | 6/2005 | Sanematsu | H02K 33/16 |
| | | | 310/15 |
| 2006/0021227 A1 * | 2/2006 | Shiba | B26B 19/04 |
| | | | 30/43.92 |
| 2008/0307654 A1 * | 12/2008 | Motohashi | B26B 19/282 |
| | | | 30/45 |
| 2012/0150291 A1 * | 6/2012 | Aber | H02J 50/12 |
| | | | 623/3.14 |
| 2012/0266398 A1 * | 10/2012 | Lee | A61C 17/3472 |
| | | | 15/22.2 |
| 2016/0000543 A1 * | 1/2016 | Kobayashi | A61C 17/3481 |
| | | | 15/22.1 |
| 2016/0168912 A1 | 6/2016 | Mitchell et al. | |
| 2020/0188221 A1 * | 6/2020 | Lenke | A61H 19/34 |
| 2022/0200430 A1 | 6/2022 | Cui et al. | |
| 2022/0247297 A1 | 8/2022 | Shizu | |
| 2023/0198363 A1 * | 6/2023 | Chi | H02K 33/12 |
| | | | 310/28 |

* cited by examiner

OSCILLATING LINEAR MOTOR WITH ROTORS, STATOR AND SWING ROD FIXED TO SEAT

TECHNICAL FIELD

The present disclosure relates to the field of motors of household appliances, and more particularly, to an oscillating linear motor with rotors, stator and swing rod fixed to seat.

BACKGROUND

At present, during use of a hair clipper, a blade used for cutting hair needs to move reciprocally at a high frequency, and this process needs to be completed by means of a motor and a transmission structure. For example, Chinese Patent Application No. 202111536822.8 discloses a vibration motor implemented by using an electromagnetic levitation technology. An approximate force transmission process is that: a coil emits a magnetic induction staggered force to drive a rotor located below a swing rod, and then the rotor drives the swing rod to move at a high frequency. In this process, to improve a swing frequency of the swing rod, an elastic piece connecting seat is fixed to a top of the swing rod, the elastic piece connecting seat is vertically connected to an elastic piece, an upper end of the elastic piece is fixed with the elastic piece connecting seat, and a lower end is fixed to a bottom corner support.

Now, in an arrangement manner above, in an actual working process, the lower end of the elastic piece is fixed, and the upper end of the elastic piece is a swing side thereof, which leads to a great force born by the swing rod in the actual working process. A force is transmitted in a manner that the swing rod drives the elastic piece connecting seat to drive the elastic piece to deform after the rotor drives the swing rod, which is equivalent to that the swing rod directly bears an elastic force of the elastic piece. The elastic piece connecting seat is fixed to an upper end of the swing rod, a lower end of the swing rod is driven by the rotor, and a force exerted by the rotor on the swing rod and a force exerted by the elastic piece on the swing rod are opposite forces, so that the swing rod is prone to deforming and twisting.

SUMMARY

An objective of the present disclosure is to provide an oscillating linear motor with rotors, stator and swing rod fixed to seat for reducing workload of a swing rod.

The above objective is achieved by the following technical means: an oscillating linear motor with rotors, stator and swing rod fixed to seat includes a housing. A coil fixing base for winding a coil is mounted in the housing. A stator is fixed to an interior of the coil fixing base. Rotors float at a top of the stator. Two groups of rotors are arranged symmetrically. A movable bottom seat is arranged above each group of rotors. The movable bottom seats are driven to move by respective rotors. Both sides of the movable bottom seat are connected to connecting pieces. An upper end and a lower end of the connecting piece are respectively connected to the housing and the movable bottom seat. A swing rod is fixed to an upper part of each movable bottom seat.

An further optimization is that: the housing is provided with a lower chamber for placing the coil fixing base and an upper chamber for accommodating the swing rods.

An further optimization is that: an upper top plate is fixed to a top of the upper chamber; and an upper end of the connecting piece is fixed to the upper top plate.

An further optimization is that: a magnetic block is fixed to a lower part of the movable bottom seat; and the stator is fixed to the magnetic block in an embedded manner.

An further optimization is that: one of the swing rods is mounted with a drive rod after upwards extending out of the housing.

An further optimization is that: a linkage piece is in butt-joint between the two swing rods; and the linkage piece enables one of the swing rods to drive the other swing rod to move in another direction when moving.

An further optimization is that: a fixed shaft is arranged in a center of the linkage piece; the fixed shaft is rotatably connected to the upper top plate; the linkage piece is provided with a linkage groove by taking the fixed shaft as a center of symmetry; and linkage columns that match the linkage grooves are respectively arranged on the swing rods.

An further optimization is that: a reset spring is arranged between each of two sides of each swing rod and a wall surface of the upper chamber.

An further optimization is that: the swing rods are in an inverted T-shape and are provided with triangular reinforcement plates.

Compared with the conventional technology, the present disclosure has the following advantages:

1. The swing rods are mounted on the movable bottom seats. When the connecting pieces are made of a flexible material, the connecting pieces do not play a role in elastic reset here, but mainly play a role of connecting. When the connecting pieces are made of an elastic material, generated elastic forces can only act on the movable bottom seats and are not born by the swing rods, so that the swing rods bear a small force during working and do not bend and deform easily, and usage environment is stable.

2. The linkage piece directly acts on the swing rods, so that a force is transmitted more directly through a linkage connection, and a response is quicker.

3. The swing rods are in an inverted T-shape and are provided with triangular reinforcement plates, which have high structural strength and further prolong the service life thereof.

4. The reset spring is directly arranged between the swing rod and the upper chamber, and the reset spring can improve a movement frequency of the swing rod and improve the high-frequency movement capacity of the swing rod.

5. The upper top plate is of a square structure. Connecting holes are formed in an upper part of the upper top plate. Due to the square structure thereof, a connector has high universality, the motor is square, an appearance is not nitpicked, and a size is small, which is beneficial for the miniaturization of a product.

Figure 1:
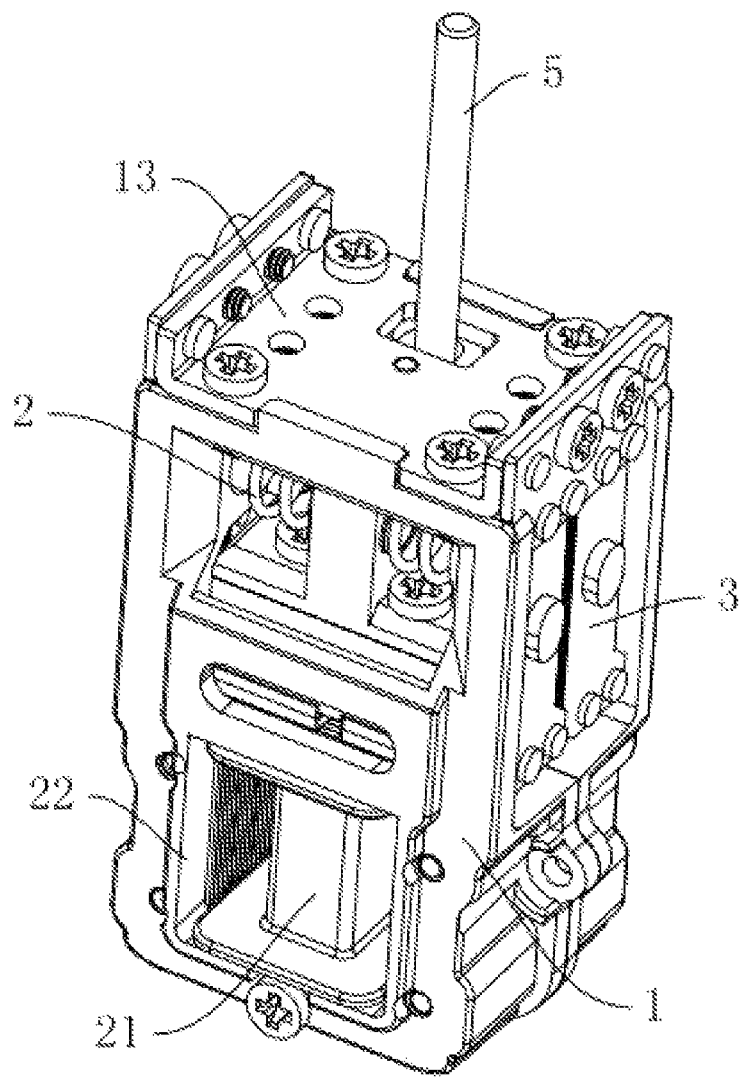
FIG. 1 is a schematic diagram of an overall oscillating linear motor with rotors, stator and swing rod fixed to seat in the present embodiment.
Figure 2:
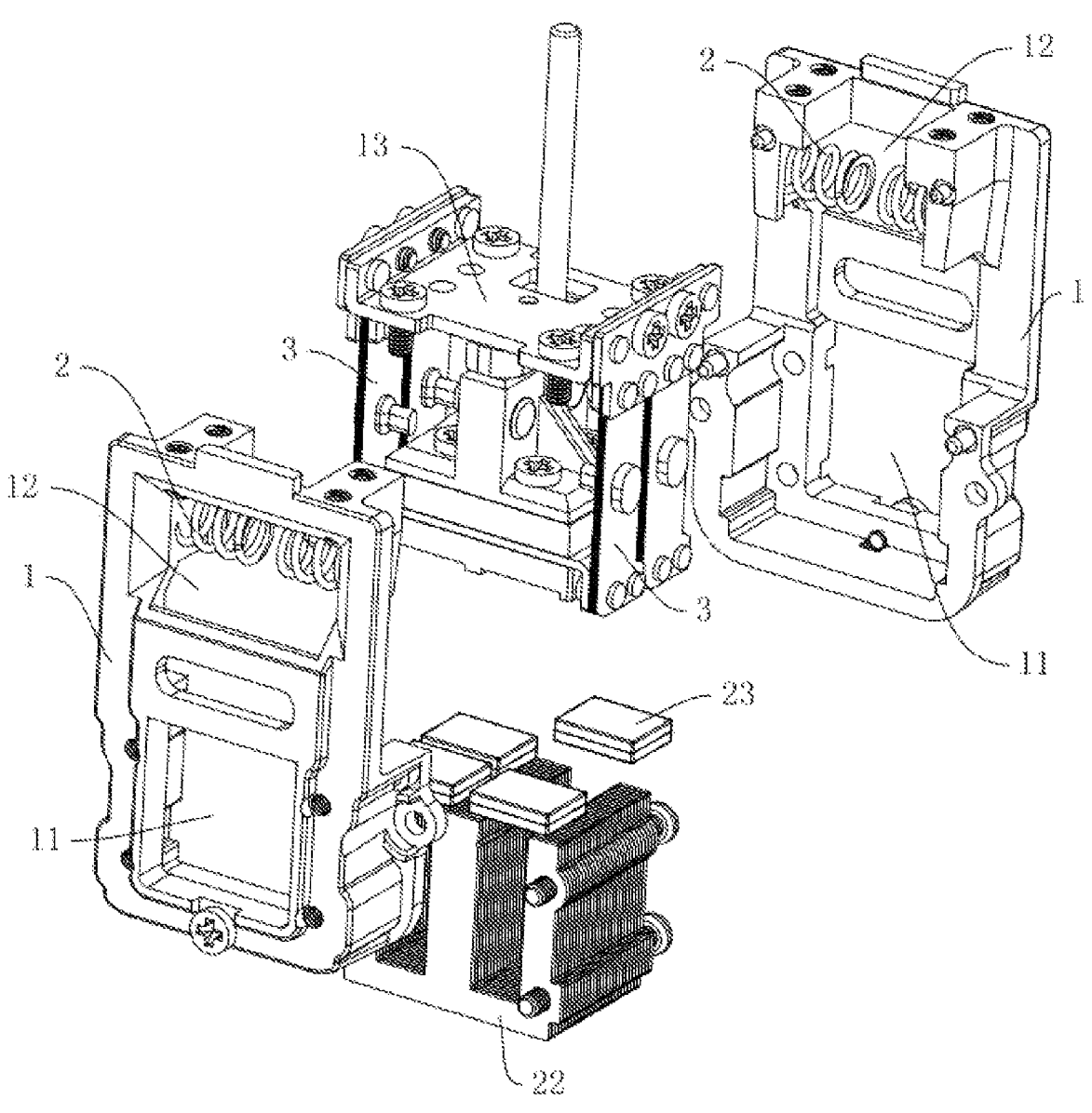
FIG. 2 is an exploded view of a motor in the present embodiment.
Figure 3:
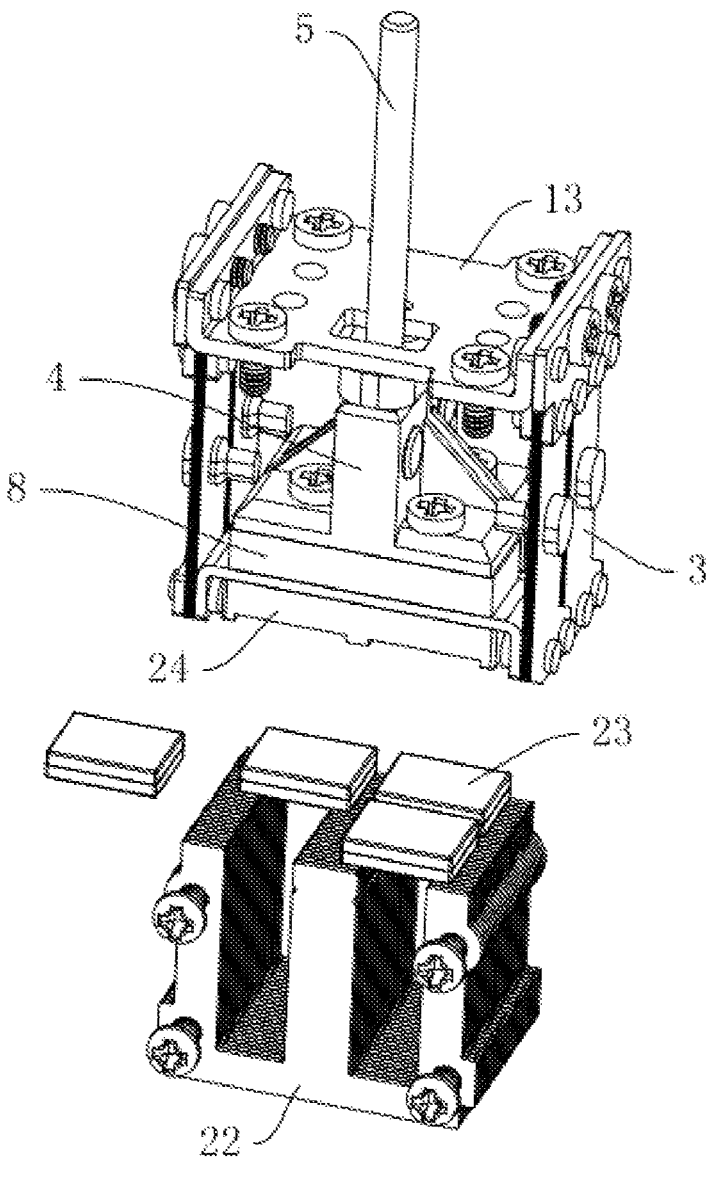
FIG. 3 is a schematic diagram of a separation of a swing part from an iron core part in the present embodiment.
Figure 4:
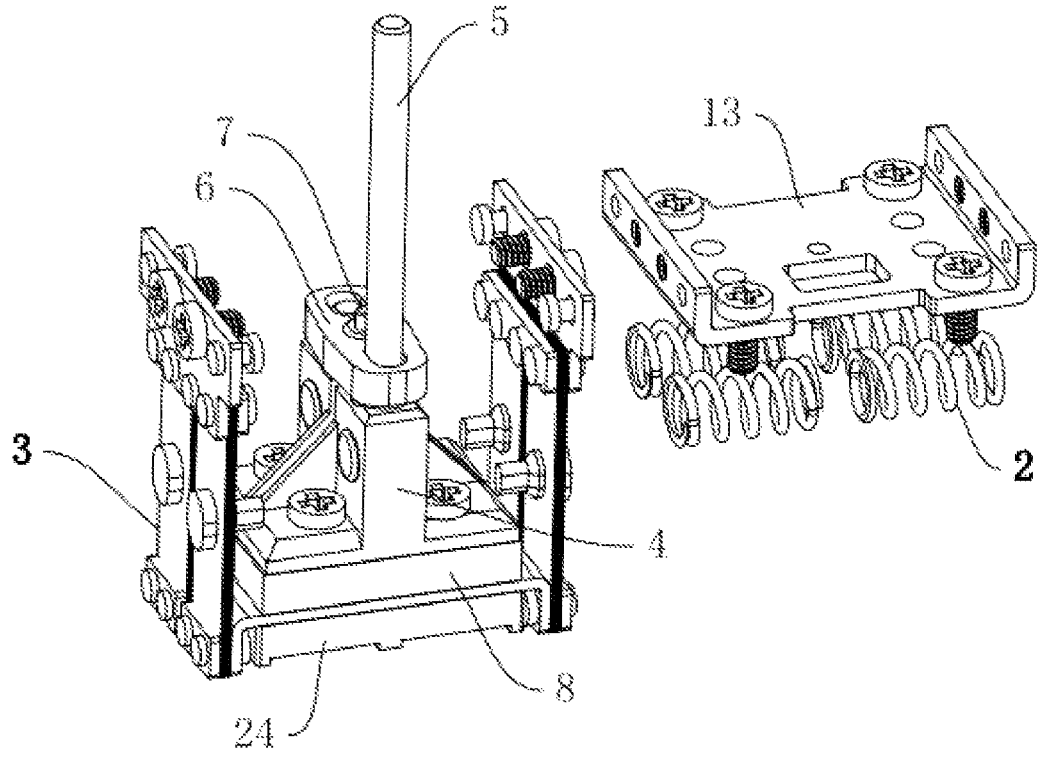
FIG. 4 is a schematic structural diagram of a swing part in the present embodiment.
Figure 5:
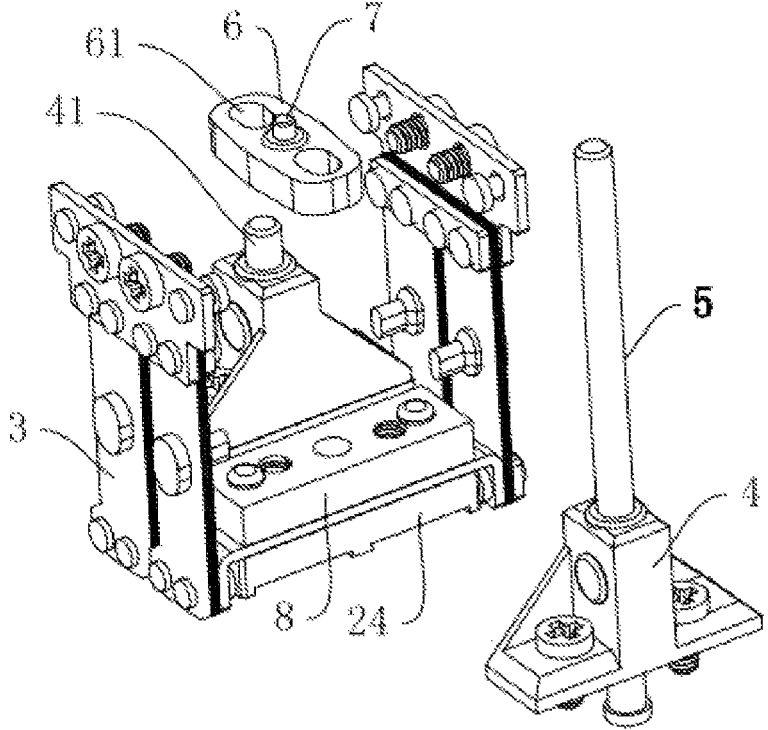
FIG. 5 is a schematic diagram of a separation of a swing rod from a movable bottom seat in the present disclosure.

In the drawings: 1, housing; 11, lower chamber; 12, upper chamber; 13, upper top plate; 2, reset spring; 21, coil fixing base; 22, iron core; 23, rotor; 24, magnetic block; 3, connecting piece; 4, swing rod; 41, linkage column; 5, drive rod; 6, linkage piece; 61, linkage groove; 7, fixed shaft; and 8, movable bottom seat.

DETAILED DESCRIPTION OF THE EMBODIMENTS

The present disclosure is further described in detail below with reference to accompanying drawings and specific embodiments. The following embodiments are only descriptive and do not limit the scope of protection of the present disclosure.

Embodiment

An oscillating linear motor with rotors, stator and swing rod fixed to seat, referring to FIG. 1 to FIG. 5, including a housing 1. The housing 1 is provided with an upper chamber and a lower chamber. A coil fixing base 21 is fixed in the lower chamber. The coil fixing base 21 is wound with a coil (not shown in the figures), and matches an E-shaped iron core 22. Two groups of rotors 23 are arranged above the E-shaped iron core 22.

Two swing rods 4 side by side are arranged in the upper chamber. The swing rods 4 are in an inverted T-shape, are provided with triangular reinforcement plates, and are fixed to movable bottom seats 8 through screws. A magnetic block 24 is fixed to a lower part of the movable bottom seat 8. The rotor 23 is fixed to the magnetic block 24 in an embedded manner. A linkage piece 6 is arranged between the two swing rods 4. A fixed shaft 7 of the linkage piece 6 is rotatably connected to an upper top plate 13. The linkage piece 6 is provided with linkage grooves 61. The linkage grooves 61 respectively match linkage columns 41 arranged on the swing rods 4, so that when one swing rod 4 moves leftwards, the other swing rod 4 will be driven to move rightwards. A reset spring 2 is arranged between the swing rod 4 and the upper chamber. A connecting piece 3 is fixed between the movable bottom seat 8 and the upper top plate 13.

Figure 6:
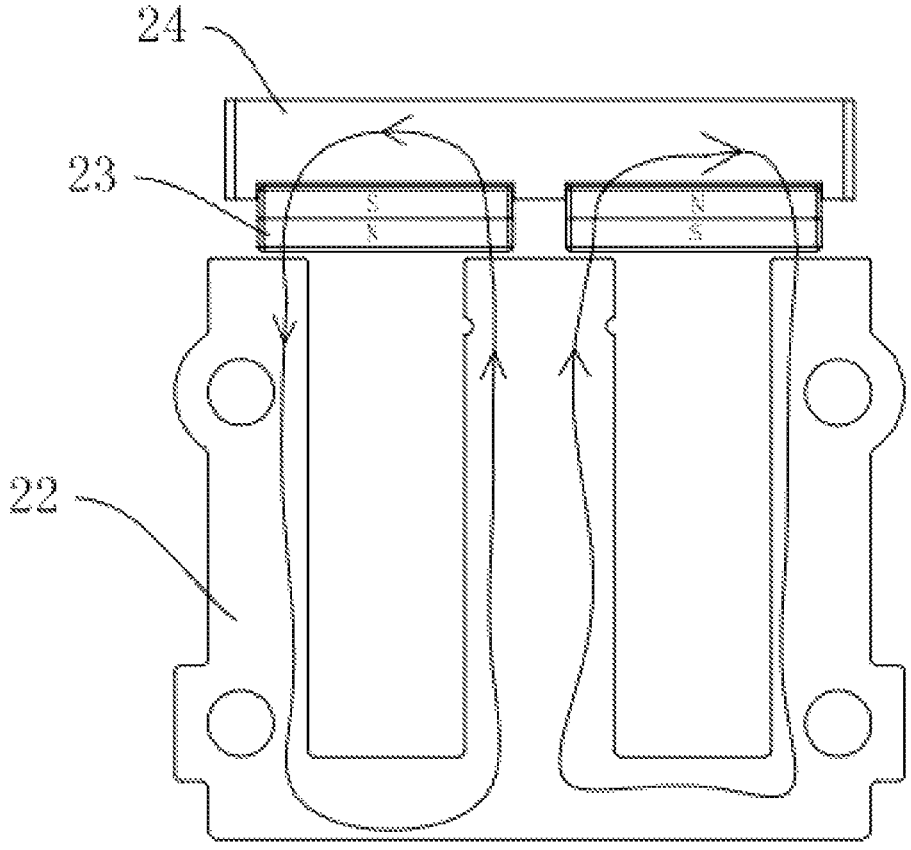
FIG. 6 is a schematic diagram of a position between a magnetic path and a magnetic block when a coil is not powered in the present embodiment.
Figure 7:
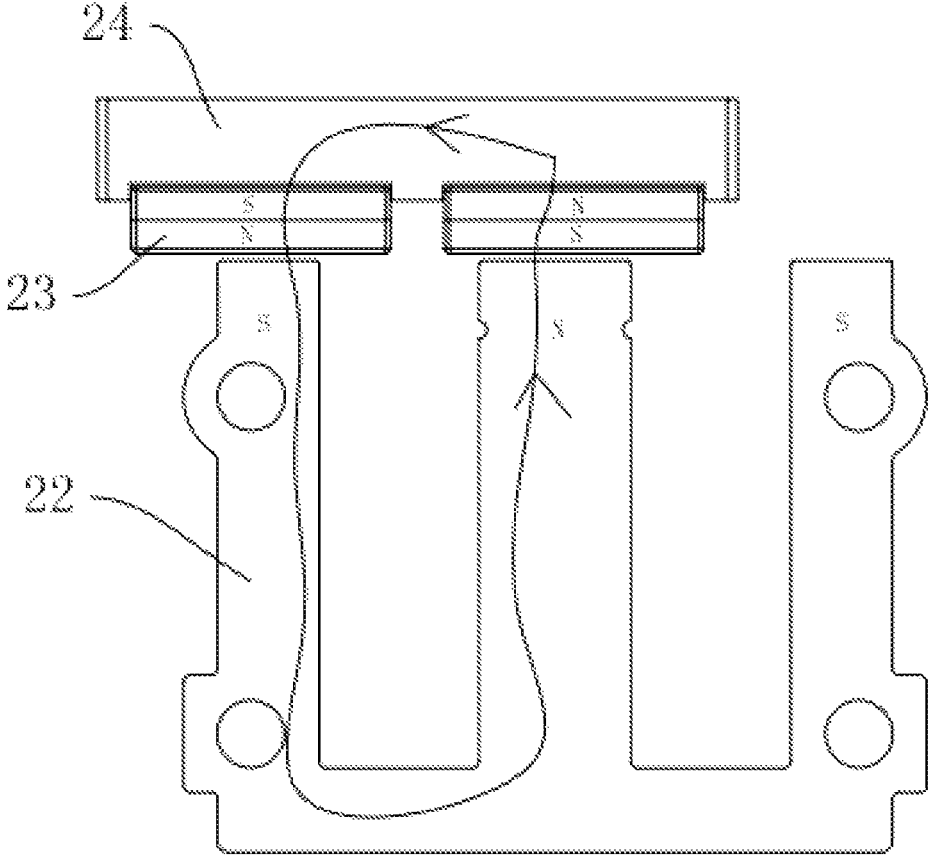
FIG. 7 and FIG. 8 are schematic diagrams of a position between a magnetic path and a magnetic block when a coil is connected to circuits in different directions in the present embodiment.
Figure 8:
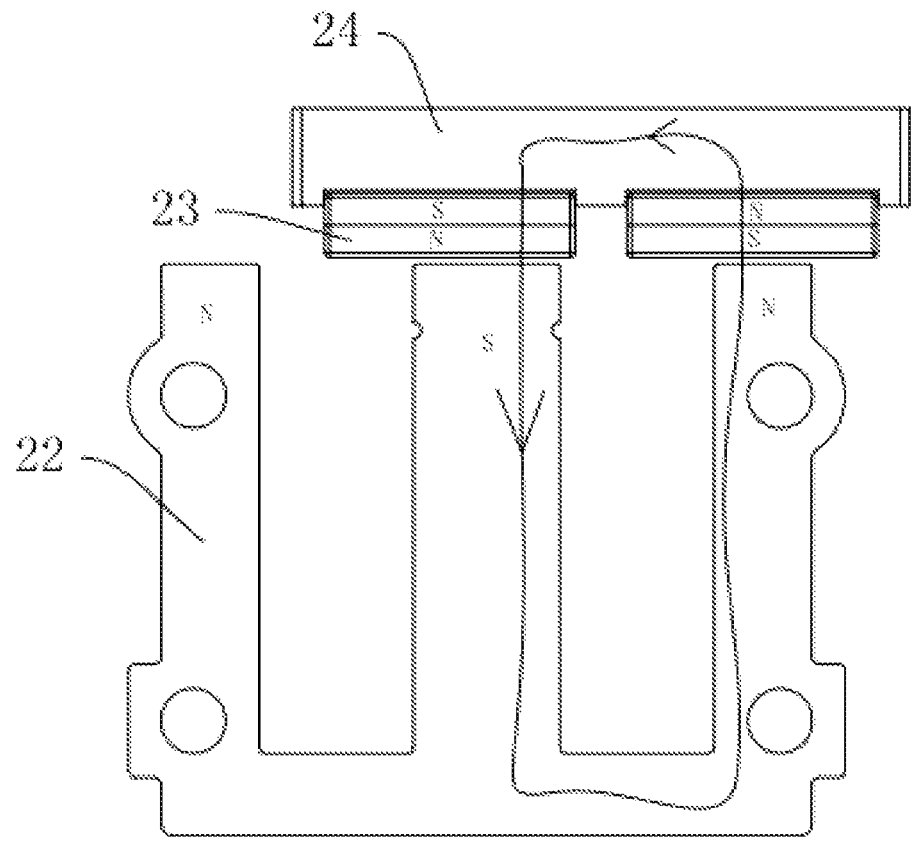

During use, referring to FIG. 6 to FIG. 8, only one group of rotors 23 can be seen here. Two rotors are arranged in this group of rotors and are embedded into a lower part of one of the magnetic blocks 24. Moreover, N and S poles of the two rotors 23 are arranged in opposite directions. First, when the coil is not powered, the E-shaped iron core stator 22 does not generate a magnetic pole, as shown in FIG. 6, the magnetic block 24 is located right above the stator 22 and does not generate any movement at this moment. When reverse current is introduced in the coil, the coil and the stator form an induced magnetic field together under a magnetic effect of the current. As shown in FIG. 7, a middle part of the stator is an N pole and two ends of the stator are S poles at this moment, so that the rotors 23 drive the magnetic block 24 to move, and similarly, the other group of rotors move reversely. When a current direction changes, the middle part of the stator is changed into an S pole, the two ends of the stator are changed into N poles, referring to FIG. 8, the rotors 23 drive the magnetic block 24 to swing to another direction, and the other group of rotors will also move reversely, thereby forming staggered reciprocating movement in opposite directions. When the rotors 23 move, the movable bottom seats 8 above the rotors 23 are driven to follow the movement. At this moment, when the movable bottom seats 8 move, the staggered movement of the swing rod 4 will drive the reset springs 2 to deform and reset. In this process, the swing rod 4 will move at a high frequency, so as to drive the drive rod 5 to move at a high frequency. Moreover, the swing rod 4 is only subjected to a driving force of the movable bottom seat 8 and an elastic force of the reset spring 2, and a force cannot be exerted to the connecting piece 3, so as to reduce the workload of the swing rod 4, and prolong the service life of the swing rod 4.

The above is only a preferred implementation of the present disclosure. The scope of protection of the present disclosure is not limited to the above embodiment. Any technical solution under the idea of the present disclosure belongs to the scope of protection of the present disclosure. It is to be noted that a plurality of modifications and refinements may be made by those of ordinary skill in the art without departing from the principle of the present disclosure. These improvement and refinements are also considered to be within the scope of protection of the present disclosure.

What is claimed is:

1. An oscillating linear motor with rotors, stator and swing rod fixed to seat, comprising a housing (1), wherein a coil fixing base (21) for winding a coil is mounted in the housing (1); a stator is fixed to an interior of the coil fixing base (21); rotors (23) float at a top of the stator; two groups of rotors (23) are arranged symmetrically; two movable bottom seats (8) are respectively arranged above two groups of rotors (23); each of the two movable bottom seats (8) is driven to move by respective group of rotors (23); both sides of the movable bottom seat (8) are connected to connecting pieces (3); an upper end and a lower end of the connecting piece (3) are respectively connected to the housing (1) and the movable bottom seat (8); and each of two swing rods (4) is fixed accordingly to each of the two movable bottom seats (8);

wherein the housing (1) is provided with a lower chamber for placing the coil fixing base (21) and an upper chamber for accommodating the swing rods (4); an upper top plate (13) is fixed to a top of the upper chamber; and an upper end of the connecting piece (3) is fixed to the upper top plate (13);

wherein a linkage piece (6) is in butt-joint between the two swing rods (4); and the linkage piece (6) enables one of the swing rods (4) to drive the other swing rod (4) to move in another direction when moving; a fixed shaft (7) is arranged in a center of the linkage piece (6); the fixed shaft (7) is rotatably connected to the upper top plate (13); the linkage piece (6) is provided with a linkage groove (61) by taking the fixed shaft (7) as a center of symmetry; and linkage columns (41) that match the linkage grooves (61) are respectively arranged on the swing rods (4).

2. The oscillating linear motor with rotors, stator and swing rod fixed to seat according to claim 1, wherein a magnetic block (24) is fixed to a lower part of the movable bottom seat (8); and the stator is fixed to the magnetic block (24) in an embedded manner.

3. The oscillating linear motor with rotors, stator and swing rod fixed to seat according to claim 1, wherein one of the swing rods (4) is mounted with a drive rod (5) after upwards extending out of the housing (1).

4. The oscillating linear motor with rotors, stator and swing rod fixed to seat according to claim 1, wherein a reset spring (2) is arranged between each of two sides of each swing rod (4) and a wall surface of the upper chamber.

5. The oscillating linear motor with rotors, stator and swing rod fixed to seat according to claim 1, wherein the swing rods (4) are in an inverted T-shape and are provided with triangular reinforcement plates.

* * * * *